US011945301B2

(12) United States Patent
Zachrisson et al.

(10) Patent No.: US 11,945,301 B2
(45) Date of Patent: Apr. 2, 2024

(54) VEHICLE WHEEL ARRANGEMENT

(71) Applicant: VOLVO TRUCK CORPORATION, Gothenburg (SE)

(72) Inventors: Jan Zachrisson, Onsala (SE); Pär Öhrfeldt, Mölnlycke (SE); Ingemar Dagh, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 105 days.

(21) Appl. No.: 17/754,186

(22) PCT Filed: Oct. 1, 2019

(86) PCT No.: PCT/EP2019/076640
§ 371 (c)(1),
(2) Date: Mar. 25, 2022

(87) PCT Pub. No.: WO2021/058118
PCT Pub. Date: Apr. 1, 2021

(65) Prior Publication Data
US 2022/0289022 A1 Sep. 15, 2022

(30) Foreign Application Priority Data
Sep. 26, 2019 (WO) ................ PCT/EP2019/076083

(51) Int. Cl.
*B60K 17/04* (2006.01)
*B60K 7/00* (2006.01)
*F16H 57/04* (2010.01)

(52) U.S. Cl.
CPC .......... *B60K 17/046* (2013.01); *B60K 7/0007* (2013.01); *F16H 57/0441* (2013.01); *F16H 57/0471* (2013.01); *B60Y 2200/14* (2013.01)

(58) Field of Classification Search
CPC . B60K 17/046; B60K 7/0007; B60Y 2200/14
See application file for complete search history.

(56) References Cited

U.S. PATENT DOCUMENTS 5,014,800 A * 5/1991 Kawamoto ............. H02K 7/10
180/65.6
8,261,866 B2 9/2012 Ishida et al.
(Continued)

FOREIGN PATENT DOCUMENTS

EP 1553332 A1 7/2005
EP 2572917 A1 3/2013
(Continued)

OTHER PUBLICATIONS

International Search Report and Written Opinion dated May 8, 2020 in corresponding International PCT Application No. PCT/EP2019/076640, 8 pages.
(Continued)

*Primary Examiner* — Erez Gurari
(74) *Attorney, Agent, or Firm* — Venable LLP; Jeffri A. Kaminski

(57) ABSTRACT

The invention provides a vehicle wheel arrangement (4) comprising a drive shaft (401), and a hub (402), the wheel arrangement further comprising a gear cavity (411) housing a gear arrangement (412) between the drive shaft and the hub, wherein the wheel arrangement comprises a container (42), and wherein a circulation passage (431, 441) extends from the gear cavity (411) to the container (42), and a feeding passage (451) extends from the container to the gear cavity, the wheel arrangement further comprising a pump (421), the pump being located along the circulation passage, the pump (421) being arranged to pump lubricant from the gear cavity to the container.

18 Claims, 4 Drawing Sheets

(56) References Cited

U.S. PATENT DOCUMENTS

| | | | |
|---|---|---|---|
| 2005/0236198 A1* | 10/2005 | Jenkins | B60L 7/24 |
| | | | 180/65.51 |
| 2009/0272596 A1* | 11/2009 | Thomson | B60K 7/0015 |
| | | | 60/393 |
| 2013/0009450 A1* | 1/2013 | Suzuki | H02K 7/116 |
| | | | 301/6.5 |
| 2013/0153338 A1* | 6/2013 | Yamauchi | H02K 9/19 |
| | | | 184/26 |
| 2013/0342150 A1* | 12/2013 | Ozaki | F16H 57/0476 |
| | | | 318/490 |
| 2017/0120675 A1* | 5/2017 | Chung | B60B 35/125 |
| 2017/0129331 A1* | 5/2017 | Naitou | F16D 55/36 |
| 2017/0313180 A1* | 11/2017 | Fliearman | F16D 13/76 |
| 2019/0047400 A1* | 2/2019 | Tamura | H02K 7/14 |
| 2020/0207204 A1* | 7/2020 | Kim | B60B 35/125 |
| 2020/0208733 A1* | 7/2020 | Kim | F16H 57/0471 |
| 2021/0167659 A1* | 6/2021 | Myouki | H02K 11/25 |
| 2021/0367465 A1* | 11/2021 | Takahashi | H02P 27/08 |

FOREIGN PATENT DOCUMENTS

| | | | |
|---|---|---|---|
| JP | 2003014094 A | 1/2003 |
| JP | 2014206207 A | 10/2014 |
| JP | 2018071679 A | 5/2018 |

OTHER PUBLICATIONS

Japanese Office Action dated Oct. 24, 2023 in corresponding Japanese Patent Application No. 2022-519071, 10 pages.

* cited by examiner

VEHICLE WHEEL ARRANGEMENT

CROSS-REFERENCE TO RELATED APPLICATIONS

This application is a U.S. National Stage application of PCT/EP2019/076640, filed Oct. 1, 2019 and published on Apr. 1, 2021, as WO 2021/058118 A1, which is a continuation of PCT/EP2019/076083, filed Sep. 26, 2019, all of which is hereby incorporated by reference in its entirety.

TECHNICAL FIELD

The invention relates to a vehicle wheel arrangement comprising a drive shaft, and a hub, the wheel arrangement further comprising a gear cavity housing a gear arrangement between the drive shaft and the hub. The invention also relates to a vehicle comprising a wheel arrangement.

The invention can be applied in heavy-duty vehicles, such as trucks, buses and construction equipment, such as wheel loaders, haulers and excavators. Although the invention will be described with respect to a truck, the invention is not restricted to this particular vehicle, or any other type of heavy-duty vehicle, but may also be used in other vehicles such as passenger cars.

BACKGROUND

A wheel arrangement for a driven wheel, may comprise a driveshaft, a hub, and a gear arrangement for speed reduction, between the driveshaft and the hub. It is desirable that the gear arrangement is provided with conditions during operation, which increases the efficiency, and reduces wear, of the gear arrangement.

EP2572917A1 describes a lubrication system for an in-wheel motor drive device. Lubricant circulates in a speed reduction portion, in a motor casing, and in a motor rear cover. Fins are formed on outer surfaces of the motor casing, and the motor rear cover. The lubricant is cooled when flowing through the motor-casing and the motor-rear-cover.

There is however a desire to further improve wheel arrangements with gear arrangements, in order to increase the efficiency, and reduce wear, of the gear arrangements.

SUMMARY

An object of the invention is to increase the efficiency of a wheel arrangement. Another object of the invention is to reduce wear in a wheel arrangement.

The objects are reached with a vehicle wheel arrangement according to claim 1. Thus, the invention provides a vehicle wheel arrangement comprising a drive shaft, and a hub, the wheel arrangement further comprising a gear cavity housing a gear arrangement between the drive shaft and the hub, wherein the wheel arrangement comprises a container, and wherein a circulation passage extends from the gear cavity to the container, and a feeding passage extends from the container to the gear cavity, the wheel arrangement further comprising a pump, the pump being located along the circulation passage, the pump being arranged to pump lubricant from the gear cavity to the container.

The gear arrangement may be arranged to provide a reduction of the rotational speed of the drive shaft to the rotational speed of the hub. The hub may comprise a wheel attachment arrangement. The pump may be arranged to pump the lubricant through the circulation passage, from the gear cavity to the container. The pump, the passages, and the container, may form parts of a lubrication system for the gear arrangement. The lubricant may be an oil.

The container may be arranged to store lubricant. Thereby, the lubricant level in the gear cavity may be relatively low. I.e., the container allows for a decreased level lubricant in the gear cavity. This entails a reduction of oil splash losses. Thereby, the efficiency of the gear arrangement may be increased. In addition, reduced splashing in the gear cavity will reduce the amount of air mixing with the lubricant. A reduction of the air in the lubricant will reduce wear of the gear arrangement.

Further, the storing of lubricant in the container allows for simultaneous cooling of a substantial portion of the lubricant. Also, by distributing a relatively large lubricant volume to the container, temperature variations in the lubricant may be relatively low. Thereby, cooling may be improved. This improved cooling will also contribute to increasing the life of the lubricant. Thereby, intervals for changing the lubricant may be increased. This facilitates the maintenance of the wheel arrangement.

Further, the container allows a large lubricant volume for the lubrication system. This allows for increasing lubricant changing intervals, without increasing wear of the gear arrangement.

Preferably, the circulation passage extends from a lower region of the gear cavity to the container. The circulation passage may comprise an evacuation passage extending from the gear cavity to the pump. Thus, the evacuation passage may extend from the lower region of the gear cavity to the pump. The circulation passage may comprise a transport passage which extends from the pump to the container. The pump may be arranged to pump lubricant from the evacuation passage to the transport passage. The evacuation passage, the pump, and the transport passage may provide a transport of lubricant from the gear cavity to the container. In some embodiments, the pump may be located at any of the ends of the circulation passage.

By the circulation passage extending from the lower region of the gear cavity to the pump, it is secured that the intake of the circulation passage is submerged in lubricant. Thereby, air will not enter the circulation passage. Thereby, air will not enter the lubrication system, even if the lubricant level in the gear cavity is relatively low. What is here referred to as the lowest region of the gear cavity, may extend vertically, when the wheel arrangement assumes an orientation that the wheel arrangement assumes when forming a part of a vehicle, from the bottom of the gear cavity and up to 30%, preferably 20%, more preferably 10%, of a maximum vertical extension of the gear cavity. In some embodiments, an inlet of the circulation passage is located at the bottom of the gear cavity. The circulation passage, e.g. an evacuation passage thereof, may form a suction pipe to collect lubricant from a lowest part of the gear cavity. In case of the gear arrangement being a planetary gearset, the circulation passage may extend from below a sun gear of the gear set, preferably below the lowest extension of the planet gears, and preferably below the ring gear. In some embodiments, the circulation passage may comprise a part underneath the gear cavity. For example, the circulation passage may comprise an oil pan underneath the gear cavity.

The container may be of any suitable size. Preferably, the volume of the container is at least 10%, more preferably at least 20%, yet more preferably at least 30%, of the volume of the gear cavity. Preferably, the container is adapted to hold, when the pump pumps the lubricant, at least 10%, more preferably at least 20%, yet more preferably at least 25%, of the lubricant appearing simultaneously in the gear cavity, the circulation passage, the pump, the container, and the feeding passage. Thereby, it may be secured that the container can hold a large enough portion of the lubricant, to provide a substantial increase in the lubricant volume, compared to known lubrication systems for wheel arrangements.

The container may be large enough for the velocities of lubricant therein to be substantially lower than the lubricant velocities in the passages. For example, the velocities of lubricant in the container may on average be no higher than 20%, or 10% of the lubricant velocities in the passages.

Preferably, an inlet of the feeding passage is located, when the wheel arrangement assumes an orientation that the wheel arrangement assumes when forming a part of a vehicle, above an outlet of the feeding passage at the gear cavity. Thereby, gravity may assist in transporting the lubricant through the feeding passage. The orientation that the wheel arrangement assumes when forming a part of a vehicle, may be an orientation when the vehicle is in an upright, horizontal position.

The pump, the circulation passage, the container, and the feeding passage, may be arranged to provide an overpressure in the container by action of the pump. Thereby, the transportation of lubricant through the feeding passage is facilitated. Specifically, pressure losses in the feeding passage may be overcome.

Preferably, an inlet of the feeding passage, in the container, is located such that, when the wheel arrangement assumes an orientation that the wheel arrangement assumes when forming a part of a vehicle, lubricant may be stored in the container below the feeding passage inlet. Thereby, the beneficial storing of lubricant, to increase efficiency, and reduce wear, is facilitated.

Preferably an outlet of the circulation passage, in the container, is located, when the wheel arrangement assumes an orientation that the wheel arrangement assumes when forming a part of a vehicle, below a portion of the circulation passage, for example below a portion of the transport passage and/or a portion of the evacuation passage. Thereby, lubricant may be prevented from being transported away from the container, through the circulation passage, when the pump is not operating, for example when the vehicle is at standstill.

The outlet of the circulation passage, in the container, may be located, when the wheel arrangement assumes an orientation that the wheel arrangement assumes when forming a part of a vehicle, below an inlet of the feeding passage. The outlet of the circulation passage, in the container, may be located, at a distance from the inlet of the feeding passage, which is at least 50% of the largest extension in any direction of the container. Thereby, a standstill condition of a portion of the lubricant may be avoided. Thus, the circulation of all of, or at least a major portion of, the lubricant, may be secured.

The wheel arrangement may comprise a spindle. The spindle may house the drive shaft. The spindle may be arranged to be mounted to, or connected to, a chassis of the vehicle.

The container is preferably fixedly mounted externally of a spindle of the wheel arrangement. Thereby, a more efficient cooling of the container, and hence the lubricant therein, may be provided. The container may be mounted on a side of the spindle that is opposite to the side on which the hub is located.

In embodiments of the invention, all the parts of the lubrication system for the gear arrangement are arranged on and/or in the spindle. Thereby, the wheel arrangement may form a "stand-alone" lubricating system. Thereby all parts of the lubrication system may be separate from other parts of the vehicle, such as the chassis. This provides for short transportation passages for the lubricant. It also makes it easy to provide maintenance to the lubrication system.

Preferably, the pump is arranged to be driven by the drive shaft. Thereby, no separate device is needed for driving the pump. Also, the pump may be advantageously positioned on the drive shaft, between the lower region of the gear cavity, and the container. When the vehicle starts moving, the pump starts moving lubricant to the container. The lubricant may then be stored in the container. The lubricant may then be circulated back to the gear cavity.

As suggested, the circulation passage may comprise an evacuation passage extending from a lower region of the gear cavity to the pump. Preferably, a check valve is provided in the evacuation passage, the check valve being arranged to prevent lubricant from moving from the pump to the lower region of the gear cavity. Thereby, a transportation of lubricant, when the pump is not in operation, through the evacuation passage, to the gear cavity, is avoided. Thereby, overfilling the gear cavity during a pump standstill, may be avoided.

Preferably, at least a part of the feeding passage is provided in the drive shaft. The feeding passage may terminate with a distribution device arranged to distribute lubricant into the gear cavity. The distribution device may be fixed to the drive shaft. The distribution device may be located at an end of the drive shaft. The distribution device may be provided as a flush device arranged to flush lubricant into the gear cavity. Thereby, an effective distribution of the lubricant in the gear cavity may be provided. Also, the rotation of the drive shaft will facilitate the transport of lubricant to the gear cavity.

Preferably, a filter is provided in the circulation passage. Where the circulation passage comprises a transport passage extending from the pump to the container, the filter may be provided in the transport passage. The wheel arrangement may comprise a bypass passage for bypassing the filter, and a check valve arranged to selectively allow lubricant to be guided through the bypass passage to the container. The filter may extend service intervals for the lubricant. The check valve may allow for lubricant to bypass the filter, if the filter would become congested.

The objects are also reached with a vehicle wheel arrangement comprising a drive shaft, and a hub, the wheel arrangement further comprising a gear cavity housing a gear arrangement between the drive shaft and the hub, wherein a circulation passage extends from the gear cavity to a container, the wheel arrangement further comprising a pump located along the circulation passage, and a feeding passage extending from the container to the gear cavity, wherein an inlet of the feeding passage is located, when the wheel arrangement assumes an orientation that the wheel arrangement assumes when forming a part of a vehicle, above an outlet of the feeding passage at the gear cavity.

Thereby, gravity may assist in transporting the lubricant through the feeding passage. Preferably, the pump is arranged to pump lubricant from the gear cavity to the container.

The objects are also reached with a vehicle according to claim 18.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
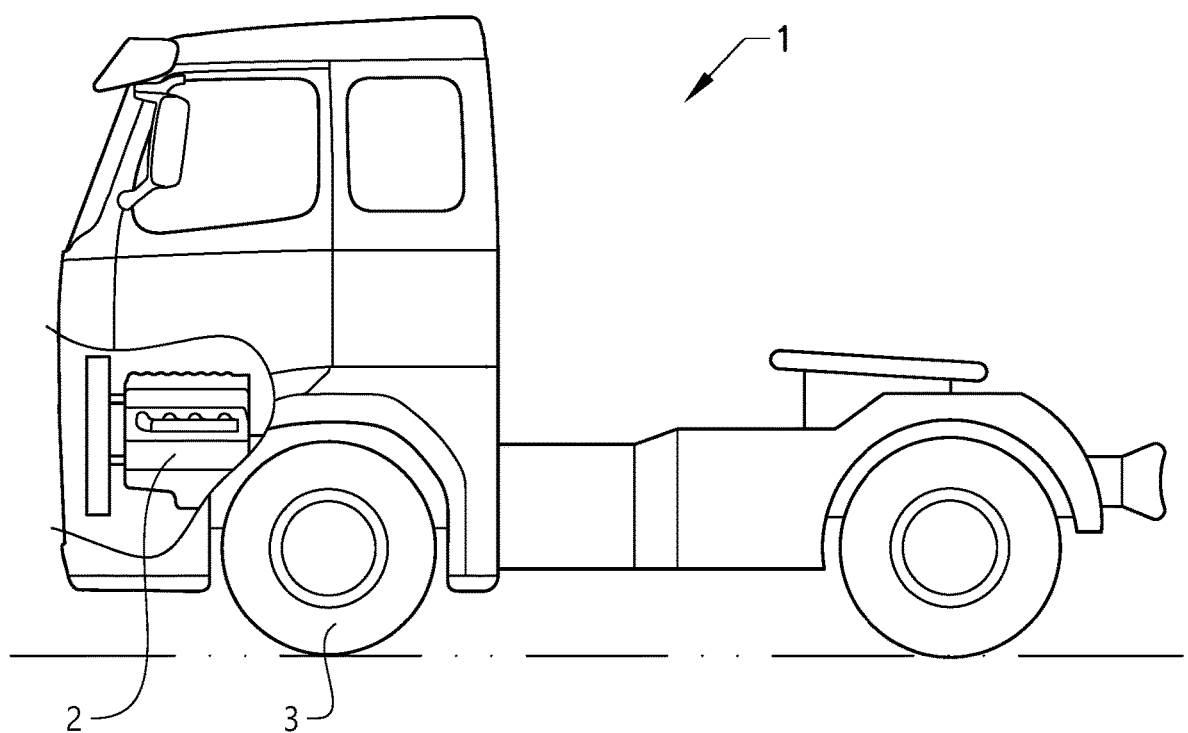
FIG. 1 is a partially sectioned side view of a vehicle in the form of a truck.

FIG. 1 shows a vehicle 1 in the form of a truck in a partly cut side view. The vehicle 1 has an internal combustion engine 2 for the propulsion of the vehicle 1. The vehicle comprises wheels, in this example four wheels. It should be noted that the invention is equally applicable to vehicles with other types of propulsion, e.g. electric. In case of an electric vehicle, an electric motor could be arranged to drive a plurality of the wheels. Alternatively, a plurality of electric motors could each be arranged to drive only a respective one of a plurality, or all, of wheels. For example, a plurality of electric motors could each be located at a respective of a plurality, or all, of the wheels.

The wheels are attached with what is herein referred to as wheel arrangements. Below, an embodiment for one of the forward wheels 3 is presented, but the invention is equally suitable for various types of wheels. The wheel for which the invention is used could be a forward wheel or a rear axle wheel. Further, the wheel for which the invention is used could be a non-steered wheel or a steered wheel.

Figure 2:
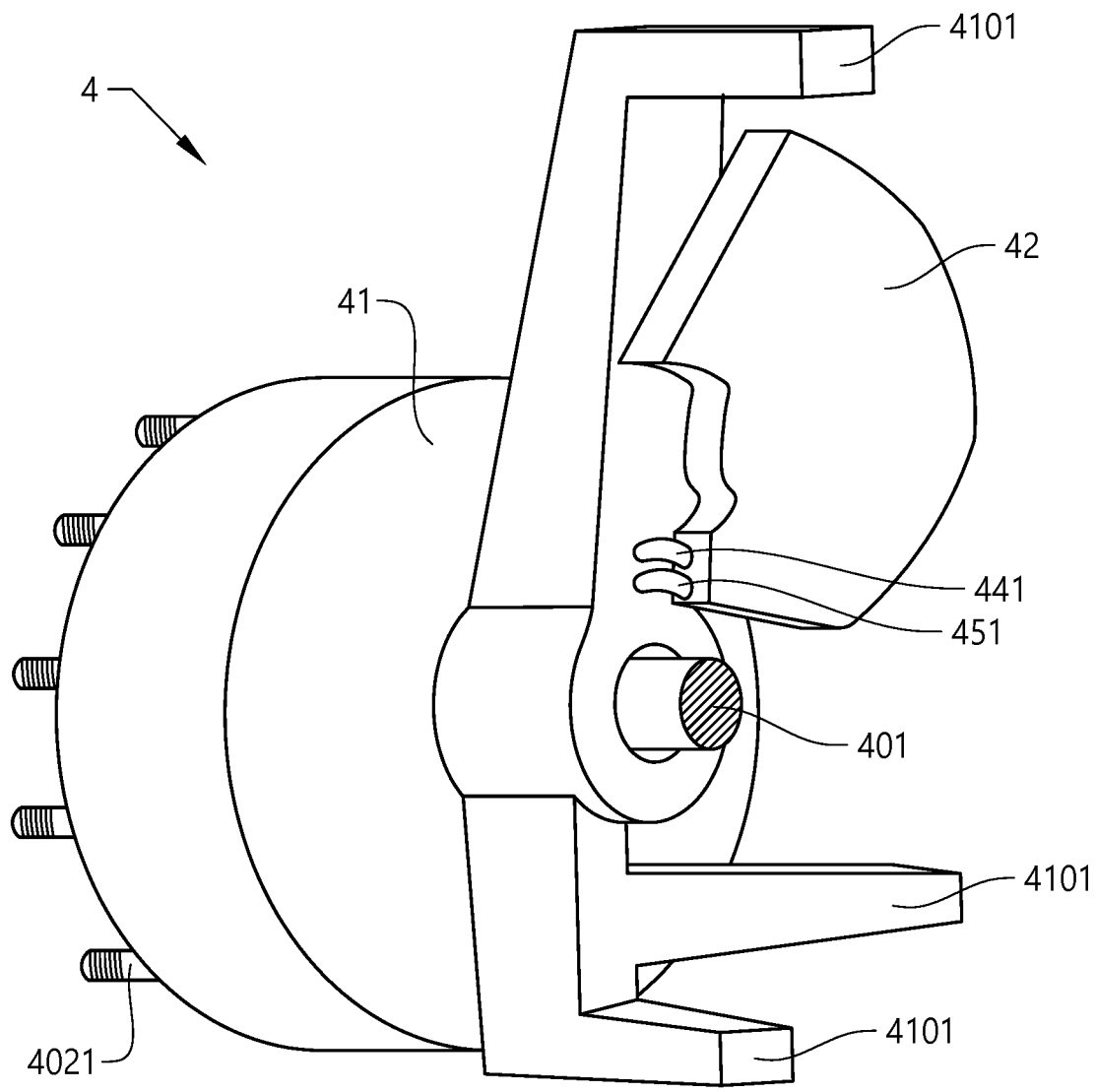
FIG. 2 is a perspective view of a wheel arrangement for one of the wheels of the vehicle in FIG. 1.

Reference is made also to FIG. 2, showing the wheel arrangement 4 for the wheel 3 shown in FIG. 1. The wheel arrangement comprises a plurality of threaded pins 4021 for attaching the wheel. The wheel arrangement comprises a spindle 41. The spindle 41 comprises mounting devices 4101 for mounting the wheel arrangement to a chassis of the vehicle, e.g. via a linkage arrangement (not shown). The wheel arrangement 4 is adapted for a driven wheel of the vehicle. For this, the wheel arrangement comprises a drive shaft 401. The drive shaft is arranged to be driven by the engine 2 (FIG. 1), via a drivetrain (not shown).

The wheel arrangement comprises a container 42 described further below. The container 42 is fixedly mounted to the spindle 41, externally thereof. In this example, the container 42 is mounted on a side of the spindle facing inwards when the wheel arrangement is mounted on a vehicle.

Figure 3:
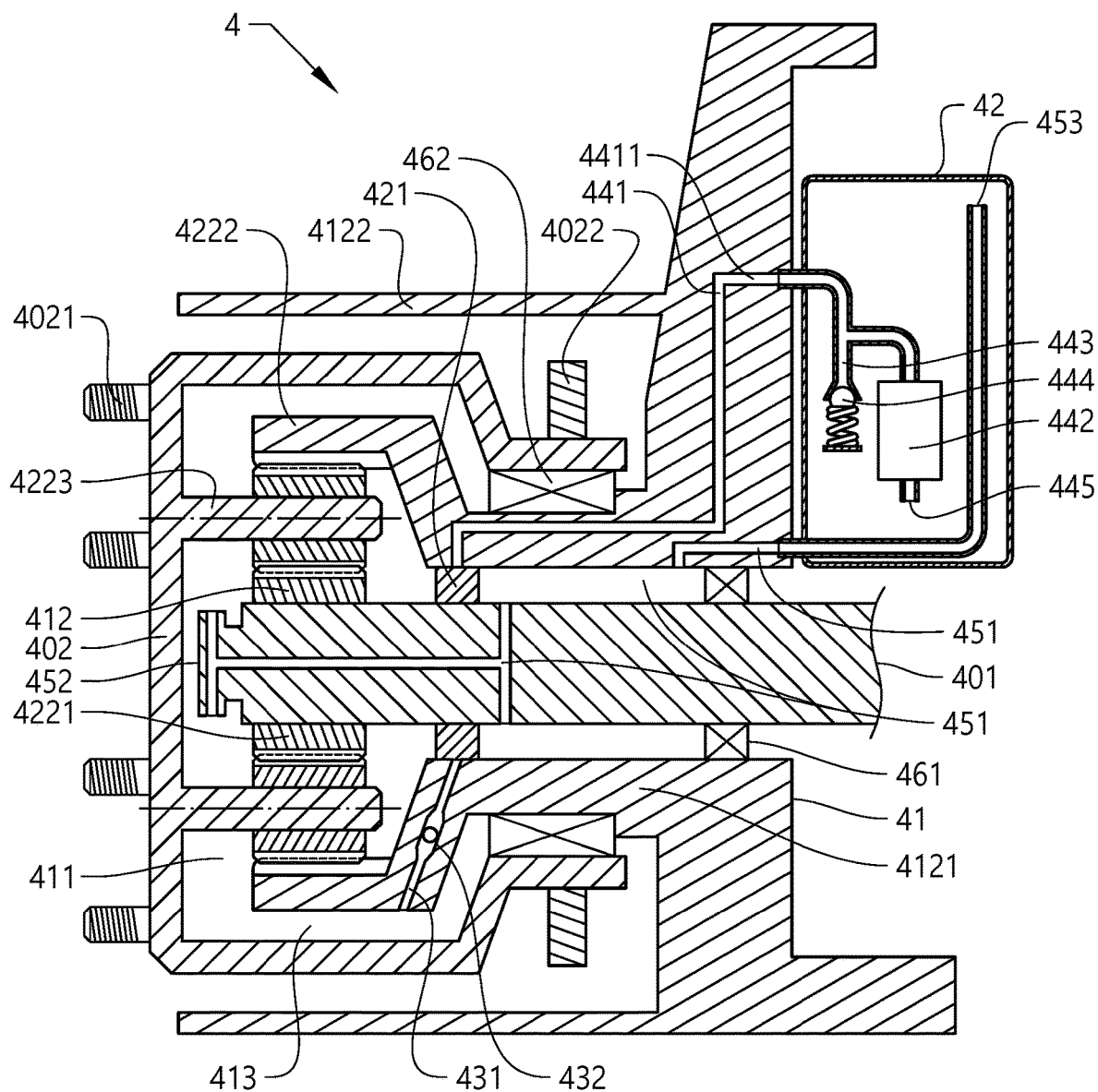
FIG. 3 is a cross-sectional view of the wheel arrangement in FIG. 2, with the section along a central rotational axis of the wheel arrangement.

Reference is made also to FIG. 3. The spindle comprises a tubular portion 4121. The tubular portion 4121 surrounds a part of the drive shaft 401.

The wheel arrangement further comprises a hub 402. The hub comprises a wheel attachment arrangement including said threaded pins 4021. The hub comprises a disc 4022 for a disc brake for the wheel.

A first bearing 461 is provided between the drive shaft 401 and the spindle 41. A second bearing 462 is provided between the hub 402 and the spindle.

A gear arrangement 412 is provided between the drive shaft 401 and the hub 402. The gear arrangement 412 comprises a planetary gear. A sun wheel 4221 is fixed to the drive shaft 401. A ring gear 4222 is fixed to the spindle 41. A planet carrier 4223 is fixed to the hub 402. The gear arrangement serves to reduce the rotational speed from the drive shaft 401 to the hub 402.

The wheel arrangement comprises a gear cavity 411 housing the gear arrangement 412. The gear cavity is formed by the hub 402, the spindle 41, and the drive shaft 401.

The spindle comprises a cover 4122 extending at least partly around the hub 402 and the gear arrangement 412.

The wheel arrangement comprises a lubrication system for the gear arrangement 412. For this, the wheel arrangement comprises a pump 421. The pump 421 is arranged to be driven by the drive shaft 401. It should be noted that alternative means for driving the pump could be provided. For example, the pump may be arranged to be driven by an auxiliary device, e.g. electric motor.

The wheel arrangement comprises a circulation passage 431, 441. The circulation passage comprises an evacuation passage 431, and a transport passage 441. The evacuation passage 431 extends from a lower region 413 of the gear cavity to the pump 421. The transport passage 441 extends from the pump to the container 42. The transport passage may at least partly extend through the spindle 41. The pump 421 is arranged to pump lubricant from the evacuation passage 431 to the transport passage 441. I.e., the pump 421 is arranged to pump lubricant from the lower region 413 of the gear cavity to the container 42. In this example, the pump is located above the lower region of the gear cavity. Thus, the pump is arranged to suck lubricant from the lower region of the gear cavity.

A feeding passage 451 extends from the container 42 to the gear cavity 411. In this example, a part of the feeding passage extends though the spindle. More generally, the feeding passage may at least partly extend through the spindle 41.

In this example, a part of the feeding passage 451 extends between the spindle 41 and the drive shaft 401. Thereby, a smaller diameter of drive shaft, compared to an inner diameter of a boring in the spindle, for the drive shaft, leaves a space for a part of the feeding channel. This space is longitudinally limited by sealing devices at the pump 421, and at the first bearing 461. More generally, the feeding passage may at least partly extend between the spindle 41 and the drive shaft 401.

In this example, a part of the feeding passage 451 extends through the drive shaft 401. For this, a lateral boring extends in the drive shaft, between the exterior of the drive shaft to a longitudinal boring in the drive shaft. The longitudinal boring leads to distribution device 452, which is fixed to the drive shaft. The distribution device forms an outlet of the feeding passage. The distribution device is provided in the form of a flush device 452 which is arranged to flush lubricant into the gear cavity 411.

Thus, in this example, the feeding passage 451 is arranged to guide lubricant from the container 42, through the spindle 41, and through the space between the drive shaft and the spindle. The feeding passage is further arranged to guide lubricant from the space between the drive shaft and the spindle, into the drive shaft, and then into the gear cavity 411 via the flush device.

Preferably, the pump 421 is adapted, in view of the transport passage 441, the container 42, and the feeding passage 451, to provide an overpressure in the container. Thereby, pressure losses in the feeding passage are overcome.

In this embodiment, a check valve 432 is provided in the evacuation passage 431. The check valve is arranged to prevent lubricant from moving by gravity, from the pump 421 to the lower region 413 of the gear cavity 411. Thereby, such lubricant movement is prevented, e.g. when the pump is at standstill.

An inlet 453 of the feeding passage 451 is located, in a normal, upright orientation of the vehicle, above the outlet 452 of the feeding passage 451 at the gear cavity 411. Further, the inlet 453 of the feeding passage 451 is located such that lubricant may be stored in the container below the feeding passage inlet 453. For this, the inlet 453 of the feeding passage 451 is located above a bottom region of the container. A major portion of an interior volume of the container may be located below the inlet 453 of the feeding passage.

The outlet 445 of the transport passage 441, in the container 42, is located, in a normal, upright orientation of the vehicle, below a portion 4411 of the transport passage 441. The outlet 445 of the transport passage 441, in the container 42, is located, in the normal, upright orientation of the vehicle, below the inlet 453 of the feeding passage 451.

A filter 442 is provided in the transport passage 441. A bypass passage 443 is provided for bypassing the filter 442. A check valve 444 is arranged to selectively allow lubricant to be guided through the bypass passage to the container 42. Thereby, the flow will not be substantially reduced, or terminated, in case the flow through the filter is inhibited.

Figure 4:
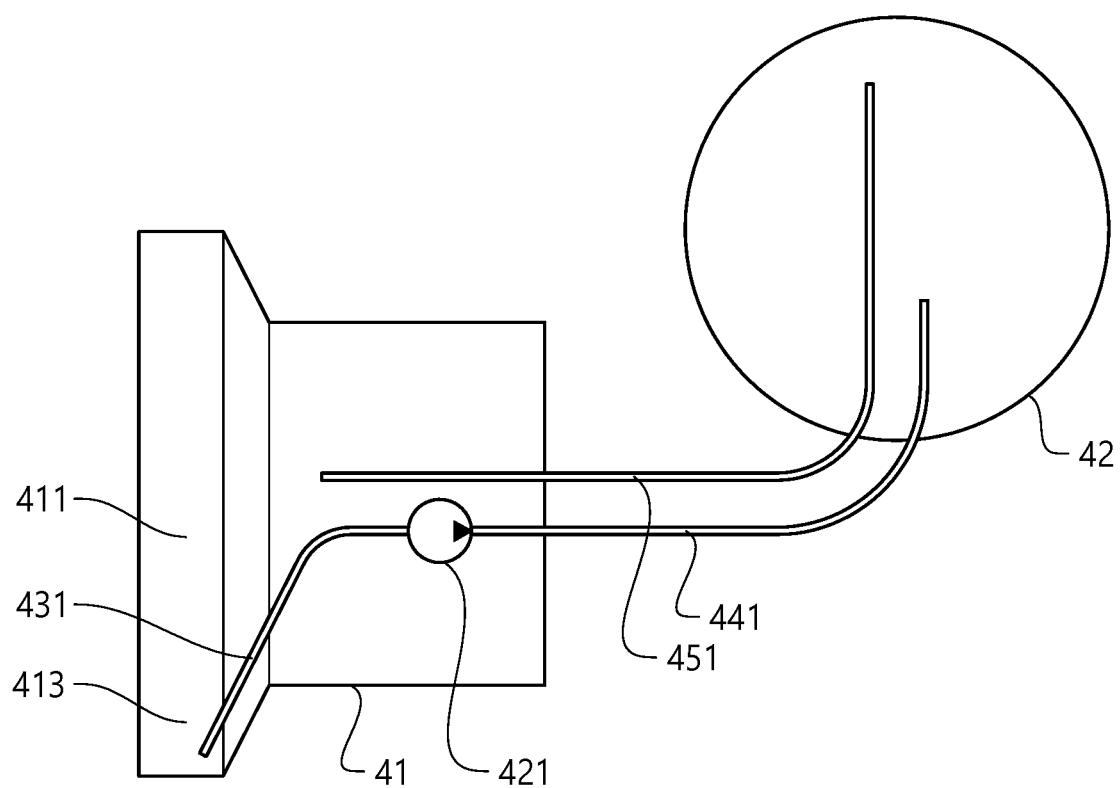
FIG. 4 shows a wheel arrangement according to a more general embodiment of the invention.

FIG. 4 shows a vehicle wheel arrangement according to a more general embodiment of the invention. The wheel arrangement 4 comprises a gear cavity 411 housing a gear arrangement between a drive shaft and a hub. The wheel arrangement further comprising a pump 421, and a circulation passage 431, 441. The circulation passage comprises an evacuation passage 431 extending from the gear cavity to the pump. The circulation passage further comprises a transport passage 441 which extends from the pump to a container 42. A feeding passage 451 extends from the container to the gear cavity. The pump 421 is arranged to pump lubricant from the gear cavity to the container.

It is to be understood that the present invention is not limited to the embodiments described above and illustrated in the drawings; rather, the skilled person will recognize that many changes and modifications may be made within the scope of the appended claims.

The invention claimed is:

1. A vehicle wheel arrangement comprising a drive shaft, and a hub, the wheel arrangement further comprising a gear cavity housing a gear arrangement between the drive shaft and the hub, characterized in that the wheel arrangement comprises a container, and in that a circulation passage extends from the gear cavity to the container, and a feeding passage extends from the container to the gear cavity, the wheel arrangement further comprising a pump, the pump being located along the circulation passage, the pump being arranged to pump lubricant from the gear cavity to the container.

2. A wheel arrangement according to claim 1, characterized in that the circulation passage extends from a lower region of the gear cavity to the container.

3. A wheel arrangement according to claim 1, characterized in that the volume of the container is at least 10% of the volume of the gear cavity.

4. A wheel arrangement according to claim 1, characterized in that the container is adapted to hold, when the pump pumps the lubricant, at least 10% of the lubricant appearing simultaneously in the gear cavity, the circulation passage, the pump, the container, and the feeding passage.

5. A wheel arrangement according to claim 1, characterized in that an inlet of the feeding passage is located, when the wheel arrangement assumes an orientation that the wheel arrangement assumes when forming a part of a vehicle, above an outlet of the feeding passage at the gear cavity.

6. A wheel arrangement according to claim 1, characterized in that the pump, the circulation passage, the container, and the feeding passage, are arranged to provide an overpressure in the container by action of the pump.

7. A wheel arrangement according to claim 1, characterized in that an inlet of the feeding passage, in the container, is located such that, when the wheel arrangement assumes an orientation that the wheel arrangement assumes when forming a part of a vehicle, lubricant may be stored in the container below the feeding passage inlet.

8. A wheel arrangement according to claim 1, characterized in that an outlet of the circulation passage, in the container, is located, when the wheel arrangement assumes an orientation that the wheel arrangement assumes when forming a part of a vehicle, below a portion of the circulation passage.

9. A wheel arrangement according to claim 1, characterized in that an outlet of the circulation passage, in the container, is located, when the wheel arrangement assumes an orientation that the wheel arrangement assumes when forming a part of a vehicle, below an inlet of the feeding passage.

10. A wheel arrangement according to claim 1, characterized in that an outlet of the circulation passage, in the container, is located at a distance from an inlet of the feeding passage, which distance is at least 50% of the largest extension in any direction of the container.

11. A wheel arrangement according to claim 1, characterized in that the wheel arrangement comprises a spindle, wherein the container is fixedly mounted externally of the spindle.

12. A wheel arrangement according to claim 1, characterized in that the pump is arranged to be driven by the drive shaft.

13. A wheel arrangement according to claim 1, characterized in that the circulation passage comprises an evacuation passage extending from a lower region of the gear cavity to the pump, and a check valve is provided in the evacuation passage, the check valve being arranged to prevent lubricant from moving from the pump to the lower region of the gear cavity.

14. A wheel arrangement according to claim 1, characterized in that at least a part of the feeding passage is provided in the drive shaft.

15. A wheel arrangement according to claim 1, characterized in that the feeding passage terminates with a distribution device arranged to distribute lubricant into the gear cavity.

16. A wheel arrangement according to claim 1, characterized in that a filter is provided in the circulation passage.

17. A wheel arrangement according to claim 16, characterized in that the wheel arrangement comprises a bypass passage for bypassing the filter, and a check valve arranged to selectively allow lubricant to be guided through the bypass passage to the container.

18. A vehicle comprising a vehicle wheel arrangement according to claim 1.

* * * * *